INVENTOR
ERCOLE COMERIO

INVENTOR
ERCOLE COMERIO

BY Stevens, Davis, Miller + Mosher
ATTORNEYS

Sept. 21, 1965 E. COMERIO 3,207,108
DEVICES FOR CONTROLLING THE MOVEMENT OF THE NEEDLES
OF EMBROIDERY MACHINES
Filed Aug. 1, 1963 6 Sheets-Sheet 4

INVENTOR
ERCOLE COMERIO

BY *Stevens, Davis, Miller & Mosher*

ATTORNEYS

Sept. 21, 1965  E. COMERIO  3,207,108
DEVICES FOR CONTROLLING THE MOVEMENT OF THE NEEDLES
OF EMBROIDERY MACHINES
Filed Aug. 1, 1963  6 Sheets-Sheet 5
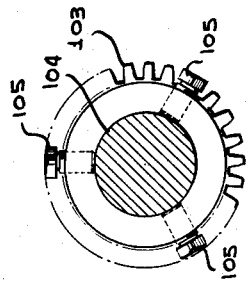
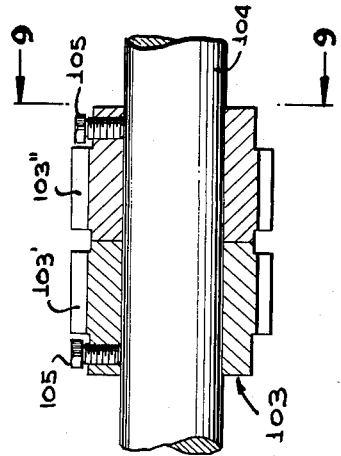
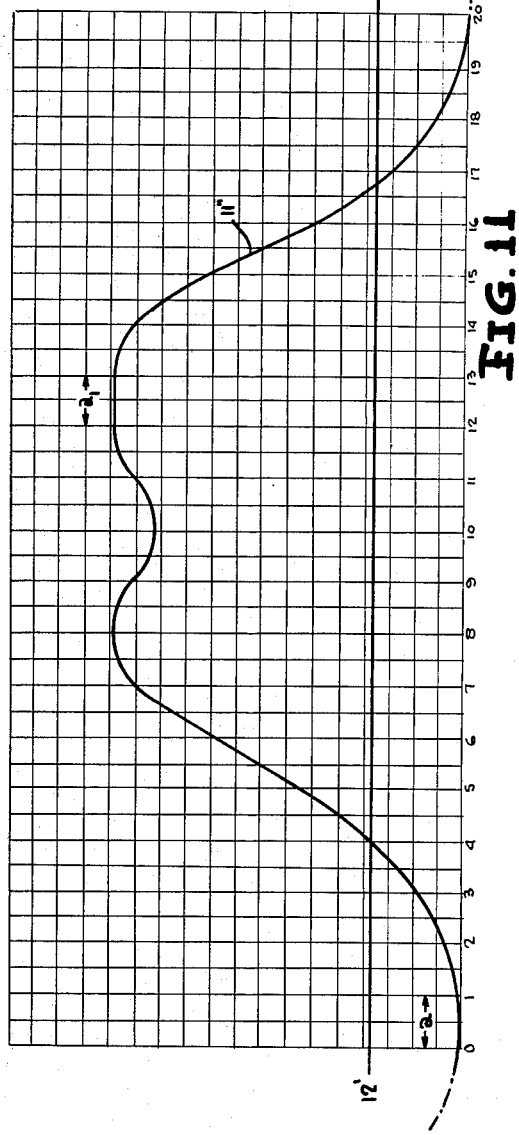
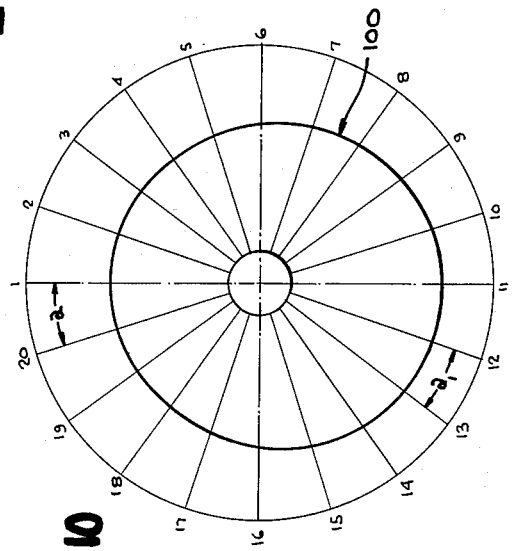
INVENTOR
ERCOLE COMERIO
BY Stevens, Davis, Miller & Mosher
ATTORNEYS

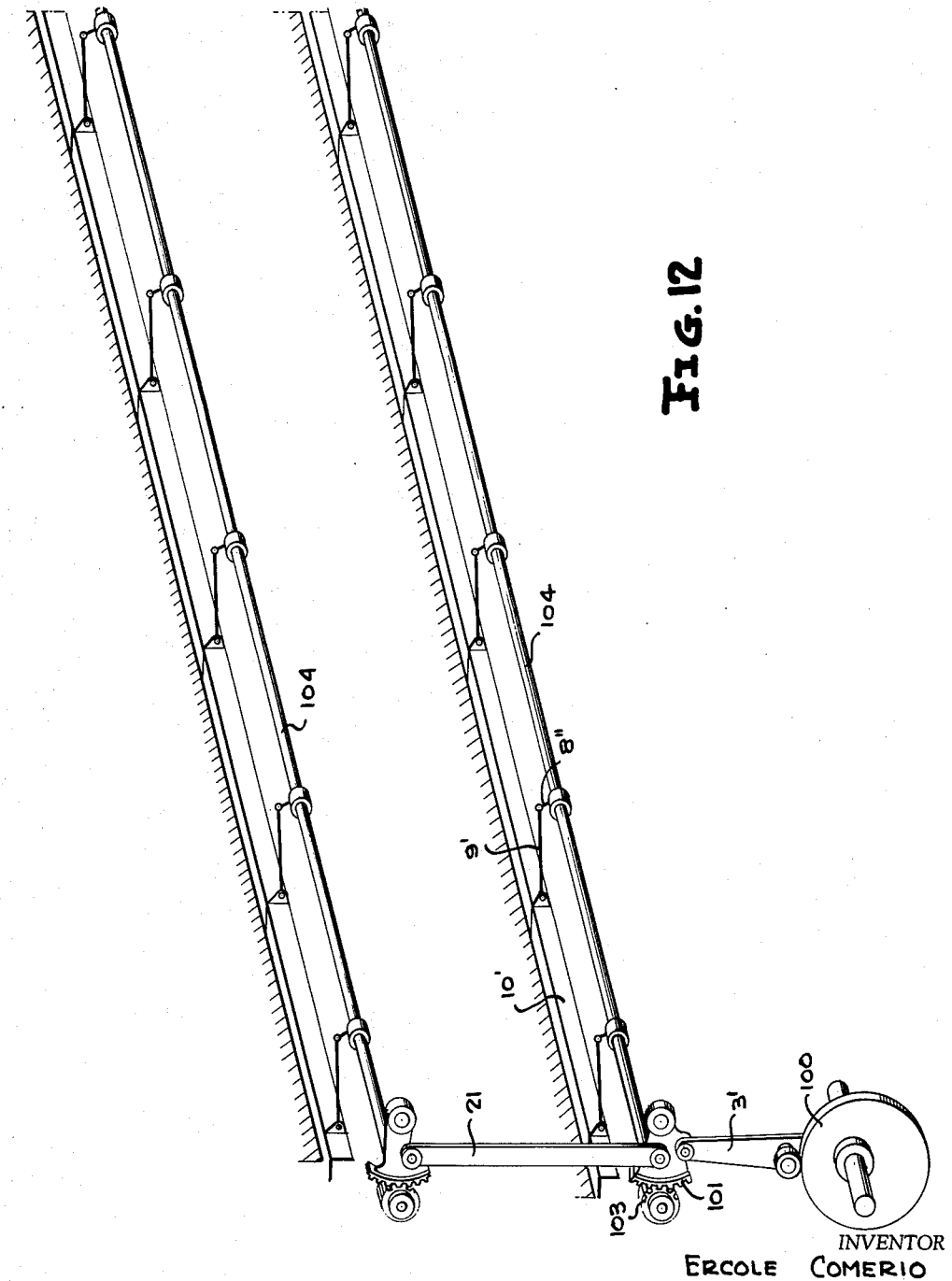

United States Patent Office 3,207,108
Patented Sept. 21, 1965

3,207,108
DEVICES FOR CONTROLLING THE MOVEMENT OF THE NEEDLES OF EMBROIDERY MACHINES
Ercole Comerio, Milan, Italy, assignor to Metalmeccanica S.p.A., Busto Arsizio, Italy
Filed Aug. 1, 1963, Ser. No. 299,282
Claims priority, application Italy, Aug. 4, 1959, 13,205/59
9 Claims. (Cl. 112—221)

This application is a continuation-in-part of Serial No. 36,622 filed June 16, 1960, now abandoned.

The present invention generally relates to improvement in embroidery machines and more particularly is directed to improvements in means for controlling the movements of the needles of such machines.

The primary object of the present invention is to provide an improved device for controlling the movement of the needle-holder plate of embroidery machines, by means of which the accelerations of the moving parts are substantially reduced and the operation of said device and of the machine is made more dependable and uniform.

This device comprises means for converting the continuous rotary motion of a drive shaft into the reciprocating motion of an oscillating arm, to one end of which arm there is pivoted a connecting rod which is articulated at the other end to the needle-holder plate so as to impart to it a linear backward and forward motion. The device is characterized by the fact that said arm oscillates, under the control of a drive means comprising a cam actuated by the drive shaft, between two extreme angular positions between which there is included a position of alignment with the connecting rod.

The details of the device in accordance with the invention will become evident from the following description of embodiments thereof and from a comparison thereof with a device of known type, each of which are shown in the accompanying drawings, in which:

FIG. 8 shows a modification of the toothed wheel for operating the connecting rod connected to the needle bar;

FIG. 9 is a view taken along the lines 9—9 of FIG. 8;

FIG. 10 is a schematic representation of the cam;

FIG. 11 is a graph illustrating the operation of the cam; and

FIG. 12 is a perspective view of a lower and upper field of an embroidery machine using the device shown in FIGS. 6 and 7.

Figure 1:
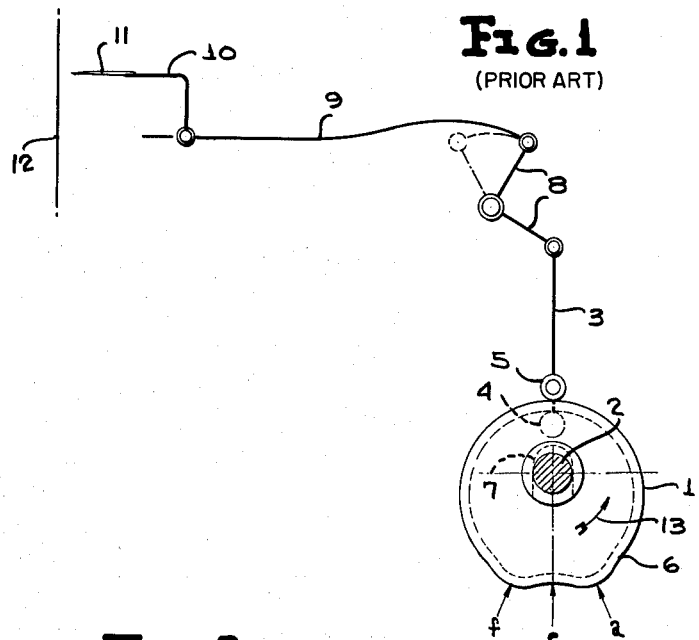
FIG. 1 is a schematic showing of a device of the known type.

In the known arrangement of FIG. 1, the movement of the embroidery needles is obtained by the rotation of a cam 1 driven by the shaft 2. This cam acts on a cam follower 3 provided with rollers 4 and 5 with which there cooperates the inner and outer profiles, respectively, of a profiled rim 6 of the cam 1 which is guided by the fork 7 between the arms of which the shaft 2 rotates.

The rotary motion of the cam 1 is thus converted into a reciprocating motion of the follower 3, which transmits this motion via the lever to two arms 8 and the connecting rod 9 to the plate 10 bearing the needles 11.

In practice, the law of movement which the cam 1 imposes on the follower 3 is that required for the needles 11 and is such that the needles 11, which in the position shown in FIG. 1 are completely withdrawn from the fabric 12 to be embroidered, upon rotation of the cam in the counterclockwise direction indicated by the arrow 13 advance toward the fabric, passing entirely through it, until the time that the point $a$ of the cam has reached the rollers 4 and 5. The rotation of the cam 1 continuing, the needles 11 move back slightly until the point $e$ has reached the rollers 4 and 5 and therefore due to the effect of the adherence of the thread borne by each needle to the fabric, there is formed in known manner, on the back of the fabric, an eyelet for the passage of the shuttle (not shown in FIG. 1).

The rotation of the cam 1 then continuing until the point $f$ reaches the rollers 4 and 5, the needles 11 are again brought forward and then again moved back to the starting point, after the point $f$ has moved beyond the rollers 4 and 5.

The simultaneous reciprocating movements of the follower 3 and of all the members kinematically connected to it (swinging arms, connecting rod and plate) during the passage of the section $a$–$e$–$f$ of the cam 1 below the follower, for the formation of the eyelet, cause accelerations which are greater as the variation of the distance of the points $a$, $e$ and $f$ from the axis of rotation of the cam becomes greater, and which gives rise to vibrations of the entire machine. In order to reduce the damage resulting from these vibrations, and in particular the extensive wear of the moving parts, it is necessary to limit the radial distance of the point $e$ with respect to the points $a$ and $f$. This, however, causes a decrease in the dimensions of the eyelets formed by the threads through which the shuttle must pass with the danger that this will result in the breaking of the threads or that stitches may be dropped.

These drawbacks are entirely eliminated, and practically all vibrations simultaneously done away with by the device for the control of the plate of the needles in accordance with the first embodiment which will be described below with reference to FIGS. 2 to 4.

The said device comprises a cam 1' which replaces the cam 1 and is driven by the shaft 2' which, as in the case described previously, converts the rotary motion into reciprocating motion of the follower 3' via the rollers 4' and 5' with which there correspond the inner and outer profiles respectively of a rim 6' of the cam 1'.

The follower 3' is guided by a fork 7' which surrounds the axis of the driveshaft 2' and engages at 3" in an intermediate point of a lever 14 which in its turn is pivoted at 14' on the frame, and onto the free end 14" of which these is pivoted a link 15, the other end of which is pivoted to the end of an arm 8' keyed onto the shaft 16. On shaft 16 there is also keyed an arm 8", the oscillating movement of which is transformed by means of the connecting rod 9' into linear reciprocating motion of the carriage 17 which slides on the stationary pin 18 and is integral with the plate 10' which bears the needles 11'.

The angular position of the arm 8" and the amplitude of its oscillation are so established that the arm itself between one and the other of its two end positions (FIG. 2) passes through a position of alignment with the connecting rod 9'.

The device is supplemented, in known manner, by shuttles 19 which move on inclined planes of the corresponding seats 20 with a linear or reciprocating motion behind the fabric 12' to be embroidered. The shuttles are supported vertically and perpendicularly to the needles 11' by known means, not shown in the drawing.

Figure 5:
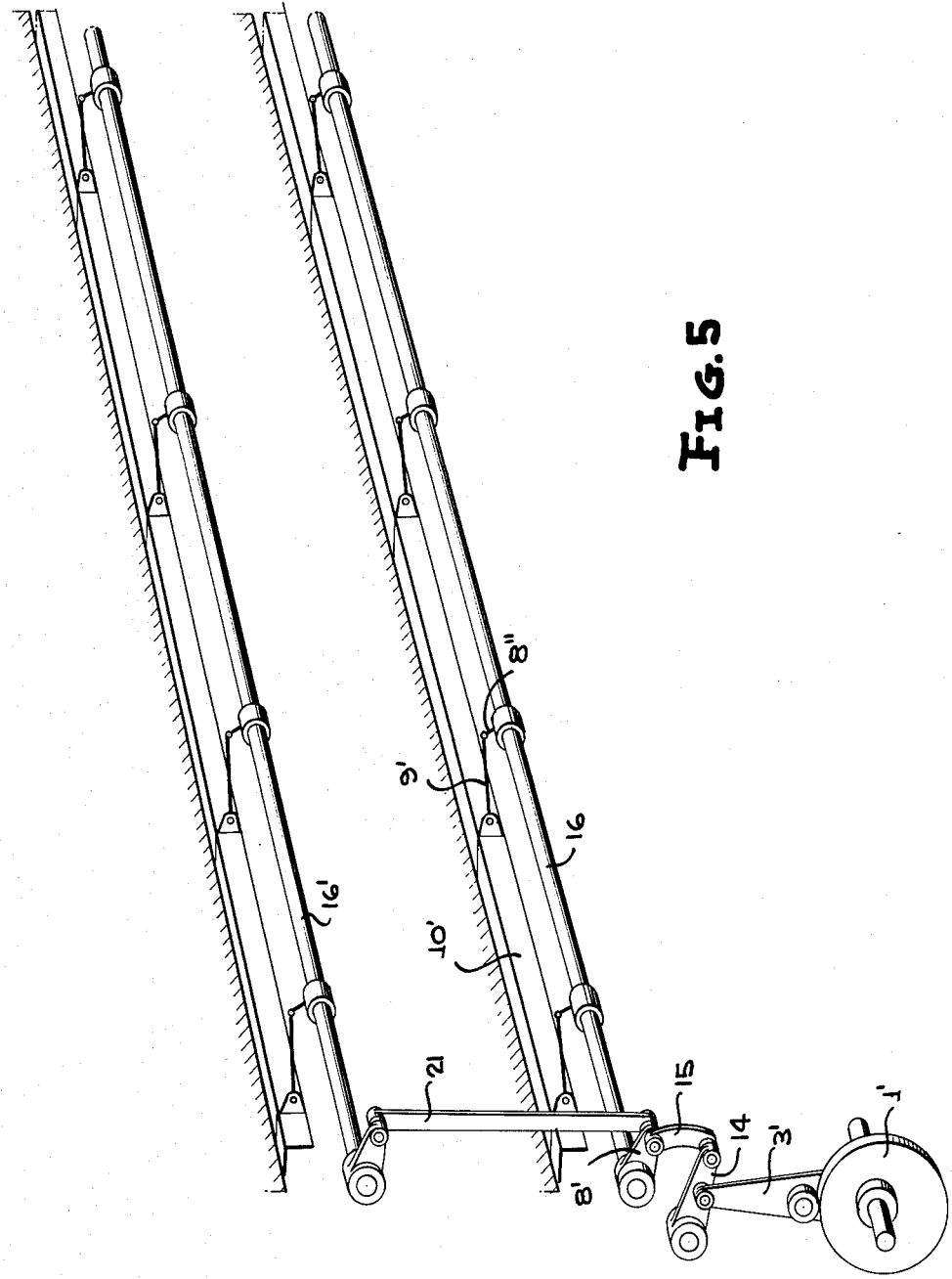
FIG. 5 is a perspective view of a lower and upper field of an embroidery machine using the device shown in FIGS. 3 and 4.

Since embroidery machines are normally composed of two fields of work, namely a lower and an upper field, a tie rod 21 serves to transmit the movement of the shaft 16 to the corresponding shaft 16' of the upper field (see FIG. 5).

The operation of the device in accordance with FIGS. 2–5 is as follows:

Starting from the position $a$ (FIG. 2) of the oscillating arm 8" which corresponds to the position in which the plate is entirely withdrawn, when the arm is displaced under the thrust of the cam 1 to the position $c$, it pushes the plate 10' forward via the connecting rod 9' and therefore also the needles 11' which advance from the position $a1$, carrying the respective threads 22 with them. When the arm 8" reaches position $b$, the needles 11' have completed the entire forward stroke and are in the position $b1$. The oscillation of the arm 8" continuing to position $c$, said arm forces the connecting rod 9' to cause the plate 10' to move back and therefore also the needles 11 to the position $c1$. During this withdrawal phase, the threads 22 which have passed through the fabric together with the needles form an eyelet 22' through which the shuttles 19, together with their threads, pass. For greater clarity of the drawing, the eyelet has been shown above the needles, but actually it is arranged on their side. Subsequently the arm 8" starts the opposite oscillating stage, namely it is displaced from $c$ toward $a$, bringing the needles back via position $b1$ into the starting position $a1$.

In this way there is carried out the sewing operation which consists in bringing the threads 22 of the needles 11' behind the fabric 12' and then holding them with the threads of the shuttles 19.

Figure 2:
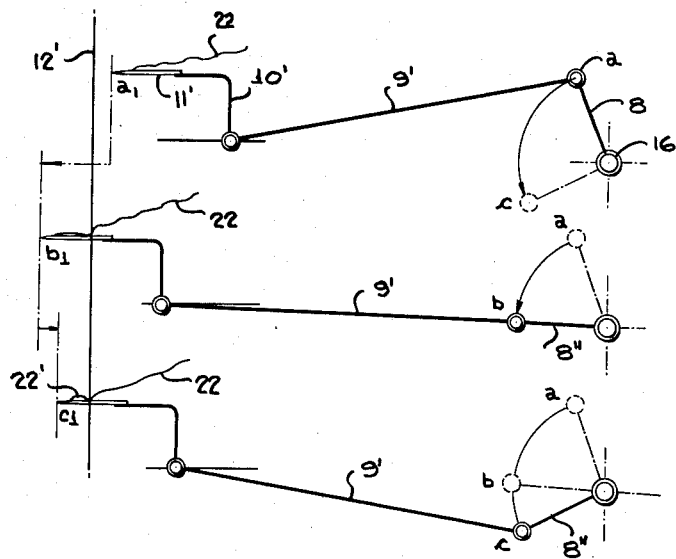
FIG. 2 is a schematic showing of one embodiment of the present invention.

From FIG. 2 it can be clearly seen that the position of alignment between the oscillating arm 8" and the connecting rod 9' satisfies the following conditions:

Of being within the complete angle of oscillation of the oscillating arm 8; and

Of being parallel to the reciprocating movement of the needles, coinciding practically with the path of displacement of the carriage 17.

Turning now to FIGS. 6–12, there is shown a cam 100 which replaces the cam 1' and is driven by shaft 2' which, as in the case described with reference to FIGS. 1 and 3, converts the rotary motion of cam 100 into reciprocating motion of the follower 3' via the rollers 4' and 5' which engage the inner and outer profiles respectively of a rim 100' of cam 100.

The follower 3' is guided by a fork 7' which surrounds driveshaft 2' and engages at 3" of an intermediate point of a toothed sector 101 which is pivotally mounted at a pivot point 102 on the machine frame (not shown). Toothed sector 101 meshes with toothed wheel 103 which is fixedly mounted on shaft 104. Arm 8" is also keyed on shaft 104, the oscillating movement of which is transformed by means of connecting rod 9' into linear reciprocating motion of carriage 17 which slides on stationary pin 18 and is integral with plate 10' which carries the needles 11'.

Cam 100 as shown in FIG. 10 still has a conventional eccentric configuration. However, cam 100 includes two zones $a$, $a1$ corresponding to sectors 0–1 and 12–13 of FIG. 10 which have their center of curvature in the cam rotation axis thereby being concentric therewith. Both of these zones define two points of rest in the movement of the needles which are indispensable for a correct and smooth operation of the shuttle as well as of the other parts which cooperate in the forming of the stitch as pointed out hereinabove in connection with FIGS. 2–5.

As shown in FIG. 11, 12'—12' is the cloth to be embroidered which extends along the abscissae which also indicate time while line 11" indicates the shifting of the needles along the ordinates. The rest zones $a$ and $a1$ are also shown on one side of cloth 12'—12' at the beginning of the movement of the needles from this one side to the other side thereof and then back again in a smooth, continuous and nonaccelerating manner.

Cam 100 therefore is a conventional eccentric cam but provided with the rest zones $a$ and $a1$ which thereby loses none of the advantages of an eccentric cam to operate the needles properly in addition to obviating the sharp accelerating movements as was the case with the cam of FIG. 1.

Figure 3:
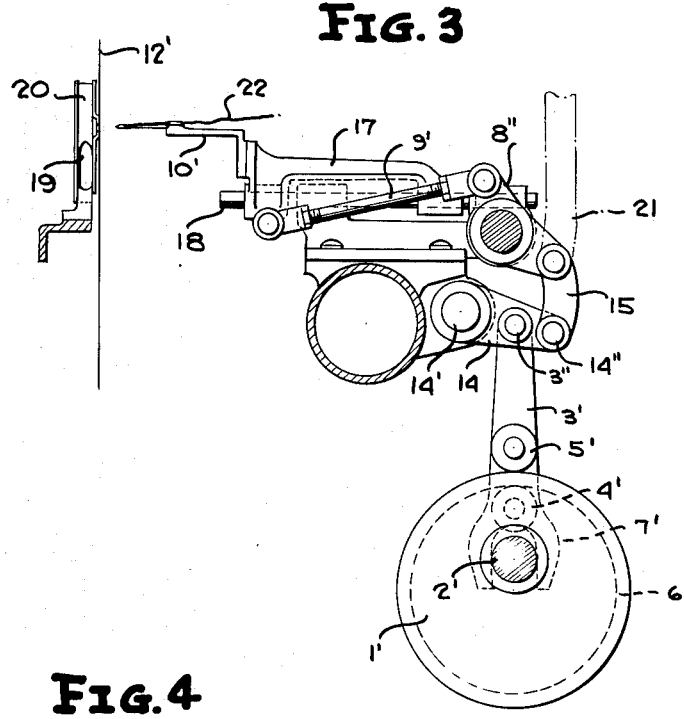
FIG. 3 is an elevational view of a practical embodiment of the arrangement of FIG. 2.
Figure 4:
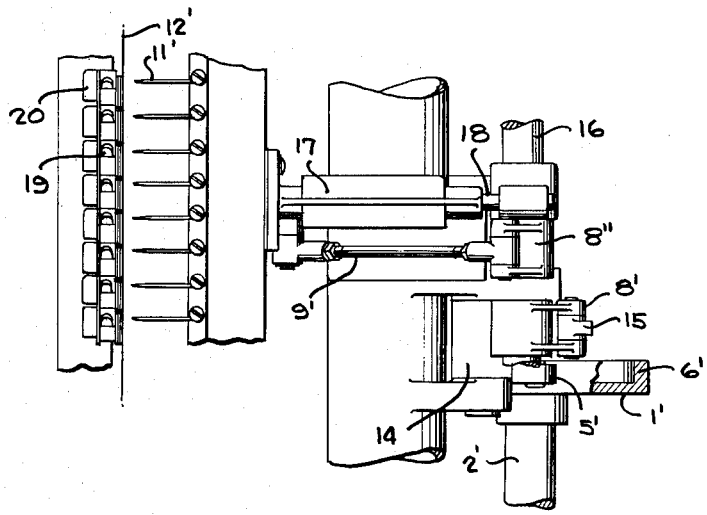
FIG. 4 is a plan view of the embodiment shown in FIG. 3.
Figure 6:
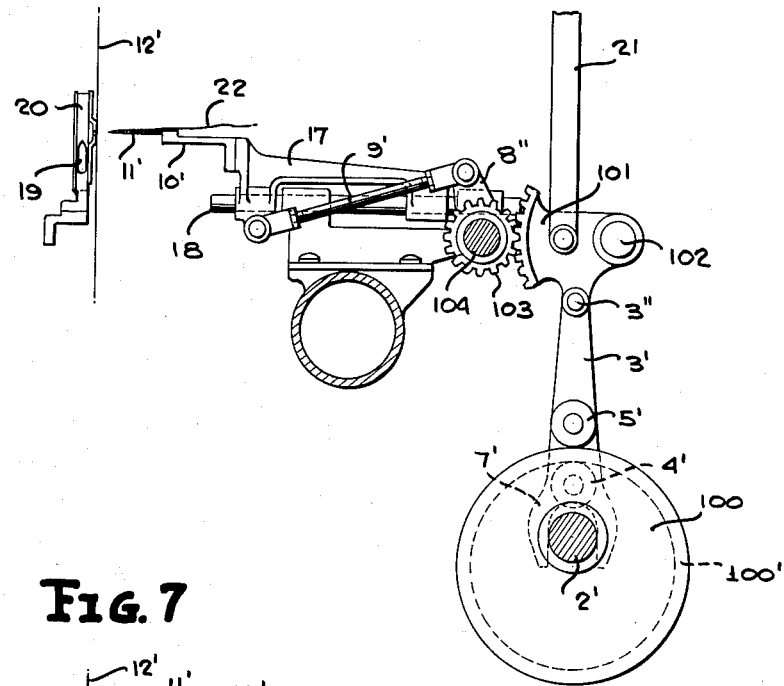
FIG. 6 is an elevational view of another embodiment of the present invention.
Figure 7:
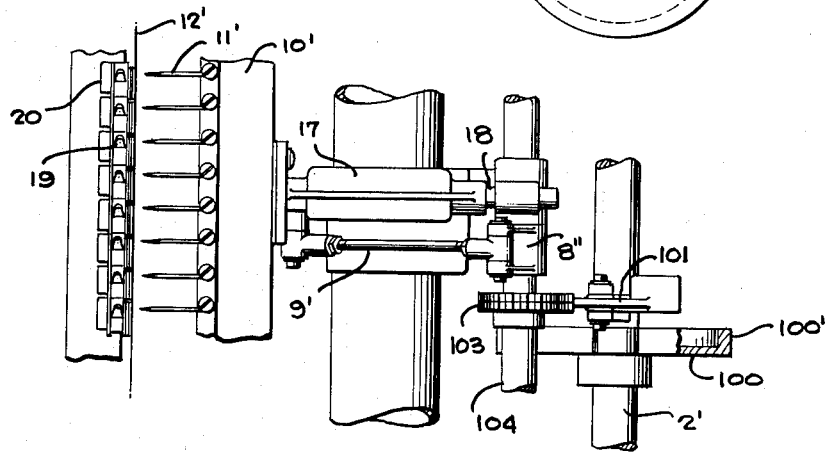
FIG. 7 is a plan view of FIG. 6.

It should also be pointed out that the device of FIGS. 6 and 7 in using only toothed sector 101, toothed wheel 103 and arm 8" performs the same operation as that of FIGS. 3 and 4 but with less elements since the device of FIGS. 6 and 7 eliminates 8', 14 and 15 of FIGS. 3 and 4.

Turning now to FIGS. 8 and 9, there is shown a modification of toothed wheel 103. In this modification, toothed wheel 103 contains two identical parts 103' and 103" rotatively mounted on shaft 104. Each part is fixedly mounted on shaft 104 by means of bolts 105 or other similar securing means such as set screws.

The advantages for making toothed wheel 103 as two parts are: (1) since toothed sector 101 constantly effects the same angular movement, it is possible by adjusting the position of both parts of toothed wheel 103 with respect to shaft 104 to vary the working range of the needles with respect to the cloth to be embroidered. This corresponds to the varying of the cloth 12'—12' of FIG. 11 with respect to the needle working range. This adjustment feature is of course necessary to make initial adjusting of the embroidery machine possible as well as later adjustments for special embroidery processes, for instance for the so called festoon as well as for embroidering on particularly heavy cloth; (2) by adjusting only one part 103' or 103" relative to the other part, it is possible to take up the slack between toothed wheel 103 and toothed sector 101 as a result of the unavoidable wearing of these parts through long use thereby obviating the necessity of having to replace these parts.

Since as stated above, the operation of the embodiment of FIGS. 6, 7 and 12 is the same as that of FIGS. 3–5 with the exception that less parts are used in the former than the latter to perform the same operation, the operation of FIGS. 6, 7 and 12 will not be set forth since such would be merely superfluous. Of course, it should be pointed out that cam 100 can be used in place of cam 1' to provide the rest zones $a$ and $a1$ for operating the device of FIGS. 3–5.

It will be understood that other practical embodiments different from those described of the device for moving the needles in embroidery machines may be utilized without thereby going beyond the scope of the invention.

What is claimed is:

1. A device for actuating needle means of an embroidery machine comprising needle-holder plate means in which said needle means are mounted, support means to which said needle-holder means is mounted including guide means for providing reciprocatory movement of said needle-holder means relative to said support means, motion transmitting shaft means disposed adjacent to and parallel to said needle-holder plate means, arm means rigidly mounted on said motion transmitting shaft means, connecting rod means pivotally connected between said needle-holder plate means and said arm means, said motion transmitting shaft means upon oscillatory movement being applied thereto transmitting such movement to said connecting rod means via said arm means which translates this movement into reciprocatory movement for said needle-holder plate means, and drive means operatively connected to said motion transmitting shaft means to impart thereto oscillatory movement to move said arm means between two angular positions and an intermediate position wherein said arm means and connecting rod means are in alignment, said drive means including drive shaft means, cam means mounted on said drive shaft means, follower means engaging said cam means, follower guide means cooperating with said follower means to translate the rotary motion of said cam means to reciprocatory motion of said follower means, means connected between said follower means and said motion transmitting shaft means for translating reciprocatory movement of said follower means to oscillatory movement of said motion transmitting shaft means, said translating means including adjusting means for adjusting the working range of the needle means and to take up the slack between said follower means and arm means, said cam means including two spaced rest zones which permit said needle means to be at rest at each rest zone during rotation of said cam means to perform smooth embroidering operations.

2. A device according to claim 1 wherein said arm means include a plurality of arms mounted at spaced intervals along said motion transmitting shaft means, said connecting rod means including a connecting rod pivotally connected between said needle-holder plate means and a corresponding arm.

3. A device according to claim 1 wherein said translating means includes linkage means.

4. A device according to claim 3 wherein said linkage means include a lever having one end pivotally mounted on said machine between said motion transmitting shaft means and said drive shaft means, a link having one end pivotally connected to the other end of said lever, said follower means being pivotally connected to said lever between the ends thereof, said link having the other end pivotally connected to a further arm—apart from said arm means—keyed on said motion transmitting shaft means.

5. A device according to claim 1 wherein said translating means includes gear means.

6. A device according to claim 5 wherein said gear means include a toothed sector and a toothed wheel, one of said toothed sector and wheel being rigidly connected to said motion transmitting shaft means while the other is pivotally connected to said machine and said follower means.

7. A device according to claim 6 wherein said toothed section is pivotally connected to said machine and said follower means and said toothed wheel is rigidly connected to said motion transmitting shaft means.

8. A device according to claim 7 wherein said toothed wheel contains two identical parts, means disposed in each part to adjustably mount the parts onto said motion transmitting shaft means to adjust the working range of the needle means and to take up the slack between said toothed sector and wheel.

9. A device for actuating needle means of an embroidery machine comprising drive shaft means, eccentric cam means mounted on said drive shaft means, follower means engaging said cam means, guide means cooperating with said follower means to translate the rotary movement of said cam means to reciprocatory movement of said follower means, motion transmitting shaft means adapted to be driven in oscillatory movement, arm means disposed on said motion transmitting shaft means, means disposed between said follower means and said arm means for translating the reciprocatory movement of said follower means to oscillatory movement to be imparted to said motion transmitting shaft means, needle-holder means in which said needle means are mounted, and connecting rod means disposed between said needle-holder means and said arm means to translate the oscillatory movement thereof to reciprocatory movement for said needle holder means, said translating means including adjusting means for adjusting the working range of the needle means and to take up the slack between said follower means and arm means, said cam means having at least two rest zones wihch permit said needle means to be at rest at each rest zone during rotation of said cam means to perform smooth embroidery operations.

References Cited by the Examiner

UNITED STATES PATENTS

| 780,130 | 1/05 | Salzer et al. | 74—53 |
| 1,139,586 | 5/15 | Schoenfeld | 112—93 |
| 1,481,340 | 1/24 | Becker | 112—135 |
| 2,184,700 | 12/39 | Horton | 74—98 X |
| 2,443,685 | 6/48 | Lyche | 74—53 X |
| 2,989,870 | 6/61 | Stahl | 74—98 |

FOREIGN PATENTS

| 227,841 | 10/10 | Germany. |
| 10,848 | 9/95 | Switzerland. |
| 31,005 | 2/04 | Switzerland. |

JORDON FRANKLIN, *Primary Examiner.*

ROBERT V. SLOAN, *Examiner.*